(12) United States Patent
Zhang et al.

(10) Patent No.: US 8,411,773 B2
(45) Date of Patent: Apr. 2, 2013

(54) SIMPLIFIED EQUALIZATION SCHEME FOR DISTRIBUTED RESOURCE ALLOCATION IN MULTI-CARRIER SYSTEMS

(75) Inventors: Xiabo Zhang, Shanghai (CN); Ni Ma, Shanghai (CN)

(73) Assignee: NXP B.V., Eindhoven (NL)

( * ) Notice: Subject to any disclaimer, the term of this patent is extended or adjusted under 35 U.S.C. 154(b) by 183 days.

(21) Appl. No.: 13/057,276

(22) PCT Filed: Aug. 4, 2008

(86) PCT No.: PCT/CN2008/001421
§ 371 (c)(1),
(2), (4) Date: Feb. 2, 2011

(87) PCT Pub. No.: WO2010/015103
PCT Pub. Date: Feb. 11, 2010

(65) Prior Publication Data
US 2011/0135019 A1  Jun. 9, 2011

(30) Foreign Application Priority Data
Aug. 4, 2008 (WO) ............... PCT/CN2008/001421

(51) Int. Cl.
*H04K 1/10* (2006.01)
*H04L 27/28* (2006.01)
(52) U.S. Cl. ........................ 375/260; 375/259
(58) Field of Classification Search ............. 375/260
See application file for complete search history.

(56) References Cited

U.S. PATENT DOCUMENTS

| | | | |
|---|---|---|---|
| 6,647,078 B1 | 11/2003 | Thomas et al. | |
| 2002/0146078 A1* | 10/2002 | Gorokhov et al. | 375/260 |
| 2002/0181549 A1* | 12/2002 | Linnartz et al. | 375/142 |
| 2003/0189972 A1 | 10/2003 | Berens et al. | |
| 2007/0297522 A1 | 12/2007 | Baggen et al. | |
| 2008/0008261 A1 | 1/2008 | Baggen et al. | |
| 2011/0310996 A1* | 12/2011 | Raleigh et al. | 375/295 |

FOREIGN PATENT DOCUMENTS

| | | |
|---|---|---|
| CN | 1750527 A | 3/2006 |
| CN | 1961548 A | 5/2007 |
| CN | 1961550 A | 5/2007 |
| WO | 01/63870 A1 | 8/2001 |
| WO | 02/067525 A2 | 8/2002 |
| WO | 2004/006525 A1 | 1/2004 |
| WO | 2007/094745 A1 | 8/2007 |

(Continued)

OTHER PUBLICATIONS

Schmidt, K., et al. "Improving the Mobility of DVB Handheld Devices with Inter-Carrier Interface Compensation," IEEE Explore, pp. 182-187 (2004).

(Continued)

*Primary Examiner* — Erin File

(57) ABSTRACT

In multi-carrier systems, distributed resource allocation of the resources of multiple user equipments (UEs) can result in better frequency diversity gain but can also induce Inter-Carrier Interference (ICI) between UEs. This ICI can become quite serious in a high mobility environment. Based on a novel radio channel model for ICI cancellation in multi-carrier systems and an iterative channel estimation scheme for ICI cancellation in multi-carrier systems, the present invention provides a simplified equalization scheme in the frequency domain to determine and remove ICI of both a targeting UE as well as other UEs.

16 Claims, 5 Drawing Sheets

FOREIGN PATENT DOCUMENTS

| | | |
|---|---|---|
| WO | 2010/015101 A1 | 2/2010 |
| WO | 2010/015104 A1 | 2/2010 |

OTHER PUBLICATIONS

Schniter, P. "Low-Complexity Equalization of OFDM in Doubly Selective Channels," IEEE Trans. on Signal Processing, vol. 52, No. 4, pp. 1002-1011 (Apr. 30, 2004).

Hrycak, T., et al. "Low-Complexity Time Domain ICI Equalization for OFDM Communications Over Rapidly Varying Channels," Proc. Asilomar Conf. Signals, Systems, Computers, pp. 1767-1771 (2006).

Fang, K. et al. "Low Complexity Block Turbo Equalization for OFDM Systems in Time- and Frequency-Selective Channels," Proc. of SPS-DARTS 2007, IEEE, pp. 83-87 (2007).

International Search Report and Written Opinion for Int'l. Patent Appln. No. PCT/CN2008/001421 (May 14, 2009).

\* cited by examiner

SIMPLIFIED EQUALIZATION SCHEME FOR DISTRIBUTED RESOURCE ALLOCATION IN MULTI-CARRIER SYSTEMS

The present invention relates generally to communication systems and more particularly to a equalization scheme in the frequency domain to consider and remove Inter Carrier Interference (ICI) of both a targeting user equipment (UE) and other UEs.

In multi-carrier systems, a symbol duration is increased by splitting the high-rate serial data stream into many low-rate parallel streams. In orthogonal frequency division multiplexing (OFDM), for example, a stream of signals is modulated on many equally spaced parallel subcarriers. Modulation and demodulation are implemented by means of Inverse Fast Fourier Transform (IFFT) 101 and its inverse (FFT) 102, respectively. The orthogonality of the signals, when transmitted over a radio channel, can only be maintained if the channel is flat and time-invariant. For time-varying channels self-interference occurs, among others, among signals at different subcarriers and is called Inter Carrier Interference (ICI). Some proposed solutions for ICI mitigation require a modification to the transmit format and are thus not suitable for existing standards. Others without this requirement cannot be used due to high speed of the user devices, e.g., when used in a vehicle, train or plane at their normal cruising speeds. Meanwhile, still others are too complex for a typical mobile user electronic device.

As shown in FIG. 1 an OFDM system is an example of a multi-carrier system in which the frequency domain signals are transformed into a time domain by an IFFT module 101:

$$s(n) = \sqrt{\frac{1}{N}} \sum_{k=0}^{N-1} d_k e^{j2\pi nk/N} (-(N-1) \le n \le N-1) \quad \text{Equation 1}$$

The received signal y(n) can be expressed as:

$$y(n) = \sum_{l=0}^{L} h(n, l) s(n-l) + w(n) \quad \text{Equation 2}$$

Replacing s(n) with Equation 1, Equation 2 can be rewritten as:

$$y(n) = \sqrt{\frac{1}{N}} \sum_{k=0}^{N-1} d_k \bar{H}_k(n) e^{j2\pi nk/N} + w(n) \quad \text{Equation 3}$$

where $$\bar{H}_k(n) = \sum_{l=0}^{L} h(n, l) e^{-j2\pi lk/N}.$$

The $k^{th}$ sub-carrier output from the FFT module 102 can be expressed as:

$$Y_k = \sqrt{\frac{1}{N}} \sum_{k=0}^{N-1} y(n) e^{-j2\pi nk/N} = d_k H_k + \alpha_k + w_k \quad \text{Equation 4}$$

where $$H_k = \frac{1}{N} \sum_{n=0}^{N-1} \bar{H}_k(n) \quad \text{Equation 5}$$

$$\alpha_k = \frac{1}{N} \sum_{m=0, m \ne k}^{N-1} d_m \sum_{n=0}^{N-1} \bar{H}_m(n) \exp[j2\pi n(m-k)/N] \quad \text{Equation 6}$$

$$w_k = \sqrt{\frac{1}{N} \sum_{n=0}^{N-1} w(n) e^{-j2\pi nk/N}} \quad \text{Equation 7}$$

The $d_k H_k$ is the expected received signal and the $\alpha_k$ represents Inter-Carrier Interference (ICI) caused by the time-varying nature of the channel. $w_k$ is white Gaussian noise. Thus, ICI is structured according to the transmit standard.

The ICI is a significant problem for multi-carrier systems, especially in a high mobility environment. As an inherent interference within OFDM-based systems, ICI results from incomplete orthogonality of the sub-carriers, which is caused by several factors, e.g., carrier frequency offset between transmitter and receiver, Doppler Effect, etc. The mobile radio channel brings the spectrum spread to the received signals. When a pure sinusoidal tone of frequency $f_c$ is transmitted, the received signal spectrum, called as Doppler spectrum, will have components in the range $f_c-f_m$ to $f_c+f_m$, which is shown in FIG. 2.

Considering one sub-carrier on the receiving side, the data on one sub-carrier is interfered with by the data on other sub-carriers, as described by the following Equations 8 and 9

$$d'_i = C_0 d_i + \sum_{\substack{l=0-L \\ l \ne i}} \bar{c}_{l-i} d_l^- \quad \text{Equation 8}$$

where $d_l$ is transmitted data, $d_l'$ is the corresponding received data, $c_{l-i}$ is the ICI coefficient representing the ICI power level from the $l^{th}$ sub-carrier on the $i^{th}$ sub-carrier:

$$c_{l-i} = \frac{1}{N} \frac{\sin\pi(l-i+\Delta fT)}{\sin\pi\left(\frac{l-i+\Delta fT}{N}\right)} \times \exp j\pi \frac{(N-1)(l-i+\Delta fT)}{N} \quad \text{Equation 9}$$

A major reason that past proposed ICI cancellation schemes have not solved the ICI problem is the lack of a suitable channel model for addressing the ICI problem in multi-carrier wireless communication systems.

In the present invention a more accurate channel model is assumed. This is a new model in which the basic idea is modelling the frequency domain channel features (ICI included) as having two parts: a first part comprising multiple fixed matrices and a part comprising unfixed variables. The unfixed variables are estimated via the pilots. The more fixed matrices that are used, the more accurately the channel is estimated. Moreover, the unfixed variables can be estimated by a linear algorithm. This new model is described in concurrently filed Provisional patent application by the present inventors, entitled "A Novel Radio Channel Model For ICI Cancellation In Multi-Carrier Systems", the entire contents of which is herein incorporated by reference.

The Doppler spectrum spread (range from $f_c-f_m$ to $f_c+f_m$) is divided into many small segments during which the channel impulse response remains almost the same. For each segment, the channel model in Equation 9 serves as a baseline. First, channel impulse response is described for every segment by employing fixed matrices and unfixed variables to represent Equation 9. By combining all segments, the channel impulse response on the whole Doppler spectrum spread is achieved.

If the segmented Doppler spread is small enough, the corresponding channel response can be treated as an impulse function in the frequency domain, as shown in FIG. 3.

For each segment, the received signal is:

$$y(n) = \sum_{l=0}^{L} h(l)\exp(j\Delta fn)s(n-l) + w(n)$$

where L is the maximum multi-path delay and $\Delta f$ is the unitary frequency offset for the segmentation, and $h(l)$ is the time domain channel parameters within one OFDM symbol. After the FFT operation at the receiver side, the received frequency domain signal is:

$$Y = \sum_{l=0}^{L} h(l)[E_l X + C E_l X] \quad \text{Equation 10}$$

where $$Y = \begin{bmatrix} Y_0 \\ Y_1 \\ \vdots \\ Y_{N-1} \end{bmatrix}$$

is the received signals in frequency domain, $$X = \begin{bmatrix} X_0 \\ X_1 \\ \vdots \\ X_{N-1} \end{bmatrix}$$

is the transmitted signals in the frequency domain, $$E_l = \begin{bmatrix} \exp(-j2\pi l \cdot 0/N) & 0 & \cdots & 0 \\ 0 & \exp(-j2\pi l \cdot 1/N) & \cdots & 0 \\ \vdots & \vdots & \ddots & \vdots \\ 0 & 0 & \cdots & \exp(-j2\pi l \cdot (N-1)/N) \end{bmatrix}$$

is the phase rotation matrix resulting from propagation delay and $$C = \begin{bmatrix} 0 & c_1 & c_2 & \cdots & c_{N-1} \\ c_{-1} & 0 & c_1 & \cdots & c_{N-2} \\ c_{-2} & c_{-1} & 0 & \cdots & c_{N-3} \\ \vdots & \vdots & \vdots & \ddots & \vdots \\ c_{-(N-1)} & c_{-(N-2)} & c_{-(N-3)} & \cdots & 0 \end{bmatrix}$$

is the matrix representing ICI, in which $c_s$ is described in Equation 9. As derived in Appendix A, $$c_s \approx \sum_{t=0}^{T} f_1(\Delta f) ctg^t(\pi s/N)(ctg(\pi s/N) - j) \quad \text{Equation 11}$$

where T is the rank number used to describe the ICI. The bigger T is, the more accurate Equation 11 will be. Therefore, Equation 11 can be rewritten as:

$$Y = \sum_{l=0}^{L} \left( h_0(l) E_l X + \sum_{t=1}^{T} h_t(l) C_t E_l X \right) \quad \text{Equation 12}$$

where $h_t(l)$ is the unfixed variables including the channel impulse response and Doppler frequency offset for corresponding segment, $$C_t = \begin{bmatrix} 0 & c_1^t & c_2^t & \cdots & c_{N-1}^t \\ c_{-1}^t & 0 & c_1^t & \cdots & c_{N-2}^t \\ c_{-2}^t & c_{-1}^t & 0 & \cdots & c_{N-3}^t \\ \vdots & \vdots & \vdots & \ddots & \vdots \\ c_{-(N-1)}^t & c_{-(N-2)}^t & c_{-(N-1)}^t & \cdots & 0 \end{bmatrix},$$

and $c_s^t = ctg^t(\pi s/N)(ctg(\pi s/V)-j)$. The matrices $C_t E_l (0 \leq t \leq T)$ of one path are the progressional spread of ICI, and t is the progressional rank. Usually the variables corresponding to lower rank matrices are larger than the variables corresponding to the higher rank matrices, i.e., $h_{t1}(l) > h_{t2}(l)(t_1 < t_2)$.

Combining all the segmentations of the Doppler spread, a practical channel model is achieved. The matrices $C_t$ and $E_l$ are fixed and only the $h_t(l)$'s are altered along with segmentations. Therefore, the format of the proposed channel model on the whole Doppler spread is the same as Equation 12, the only difference lies in $h_t(l)$.

In order to use Equation 12 to describe the channel features, a total of $(L+1)(T+1)$ variables of $(h_t(l))$ have to be estimated. A basic linear estimation algorithm is provided as an example only of how to obtain the variables $h_t(l)$. This linear estimation algorithm can be used to estimate the variables if one OFDM symbol includes $(L+1)(T+1)$ pilots signals (or more). An example of a basic linear estimation scheme is described below.

Let the transmitted data be zero value to construct:

X=[P$_0$0 ... 0P$_1$0 ... 0 ... P$_{(L+1)(T+1)-1}$]$^T$, where $P_s$ is a pilot signal and $[\ldots]^T$ is the transposition operator. Correspondingly, the received Pilot signals in the frequency domain are:

Y=[y$_0$0 ... 0y$_1$0 ... 0 ... y$_{(L+1)(T+1)-1}$]$^T$

Substituting X and Y into Equation 12 results in $(L+1)(T+1)$ equations. Then, the variables are derived by solving these linear equations, which means low processing delay and achievable performance, especially under high SNR condition.

The above channel model has two issues:
pilots are overloaded, that is, at least $(L+1)(T+1)$ pilots are necessary in one OFDM symbol, which reduces the transmission efficiency, especially when the number of sub-carriers allocated to one user is small; and the linear channel estimation operation increases the Gauss noise power level and makes the estimation difficult, especially under a low SNR condition, even using a minimum mean-square error (MMSE) algorithm.

This iterative channel estimation scheme for ICI cancellation in multi-carrier systems assumes the above channel model comprising multiple fixed matrices and unfixed variables, as shown in Equation 12 which describes the channel response, where a total of $(L+1)(T+1)$ variables ($h_i(l)$) are estimated.

Given this channel model and further assuming one OFDM symbol includes $(L+1)(T+1)$ pilot signals (or more), the iterative channel estimation scheme and a corresponding pilot allocation scheme make it possible to accurately estimate the channel response while not significantly increasing the Gauss noise power level.

For this channel model an exemplary embodiment of the present invention performs the above channel estimation iteratively as follows, and is described in concurrently filed provisional application entitled "An iterative channel estimation scheme for ICI cancellation in multi-carrier systems", by the same inventors, which is hereby incorporated herein by reference in its entirety. Considering that the matrices of one path are the progressional spread of the ICI, the unfixed variables corresponding to lower rank matrices are usually larger than those corresponding to higher rank matrices. Therefore, the variables corresponding to the lowest rank matrix for every path are first estimated, and then the contribution of the lowest rank matrix to the received signals is removed. By considering this iterative operation as a 'round' and repeating this operation as a series of 'round's, all variables can be estimated to finally obtain the channel estimation.

Further, in order to decrease correlation between different paths, an associated pilot allocation method can be employed by the present invention.

Other features and advantages of the present invention will become apparent from the following detailed description, taken in conjunction with the accompanying drawings, illustrating by way of example the principles of the present invention.

A detailed description of the iterative channel estimation method is now provided.

In a first round, $h_0(l)(0 \leq l \leq L)$ is estimated according to:

$$Y_p \approx \sum_{l=0}^{L} (h_0(l)E_l X_p) + w_p \qquad \text{Equation 13}$$

where $X_p$ is the transmitted pilot signals in the frequency domain (the signals of the data part are set as zero), $Y_p$ is the received pilot signals in the frequency domain (the signals of data part are set as zero). Only if the number of pilots exceeds L can an estimate $\hat{h}_0(l)(0 \leq l \leq L)$ of $h_0(l)$ be determined by solving Equation 13 (e.g., via ZF, MMSE, etc).

In the second round, the estimated contribution for the first rank is removed and Equation 13 is rewritten as:

$$Y_p - \hat{h}_0(l)E_l X_p \approx \sum_{l=0}^{L} (h_1(l)E_l C_1 X_p) + w_p \qquad \text{Equation 14}$$

Then $\hat{h}_i(l)(0 \leq l \leq L)$ can be determined by solving Equation 14.

The second round operation is repeatedly solved (iterated) until the variables with higher rank are obtained.

When compared with localized allocation, a distributed resource allocation scheme can fully utilize the frequency diversity advantage. However, a distributed allocation scheme is more sensitive to ICI that results from the asynchronies between multiple UEs. That is, the signal of the targeting UE is interfered with by not only its own signals (self-interference) but also by the signals from other UEs in simultaneous uplink (UL) transmission. The asynchronies may come from several sources, e.g., sampling frequency error, carrier frequency error, and Doppler frequency offset, among others.

For distributed resource allocation, this interference sometimes becomes very serious and results in a detection "Error Floor".

The present invention provides an equalization scheme for UL transmission to overcome this ICI, the detection scheme being based on the above described channel model and iterative channel estimation scheme.

Based on the above channel model, the received signals are described as the product of the transmitted signals with the channel feature matrix that comprises channel parameters, and the ICI coming from multiple UEs. The channel parameters are obtained, for example, by the above-described iterative channel estimation scheme or other equivalent schemes. Then the simplified method of the present invention provides the inverse channel feature matrix. After that, the channel equalization can be performed according to a known traditional algorithm, e.g., zero forcing ZF and MMSE.

The present invention is described by first introducing an example of the distributed resource allocation scheme of the present invention and then detailing the equalization scheme of the present invention, based on this example.

Figure 1:
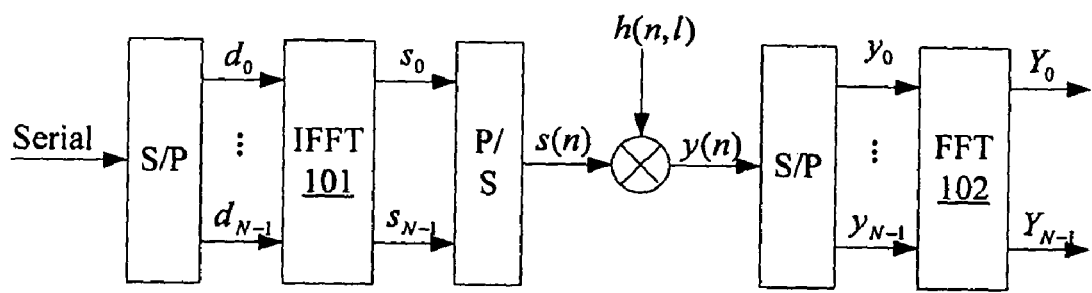
FIG. 1 illustrates a conventional OFDM system model.
Figure 2:
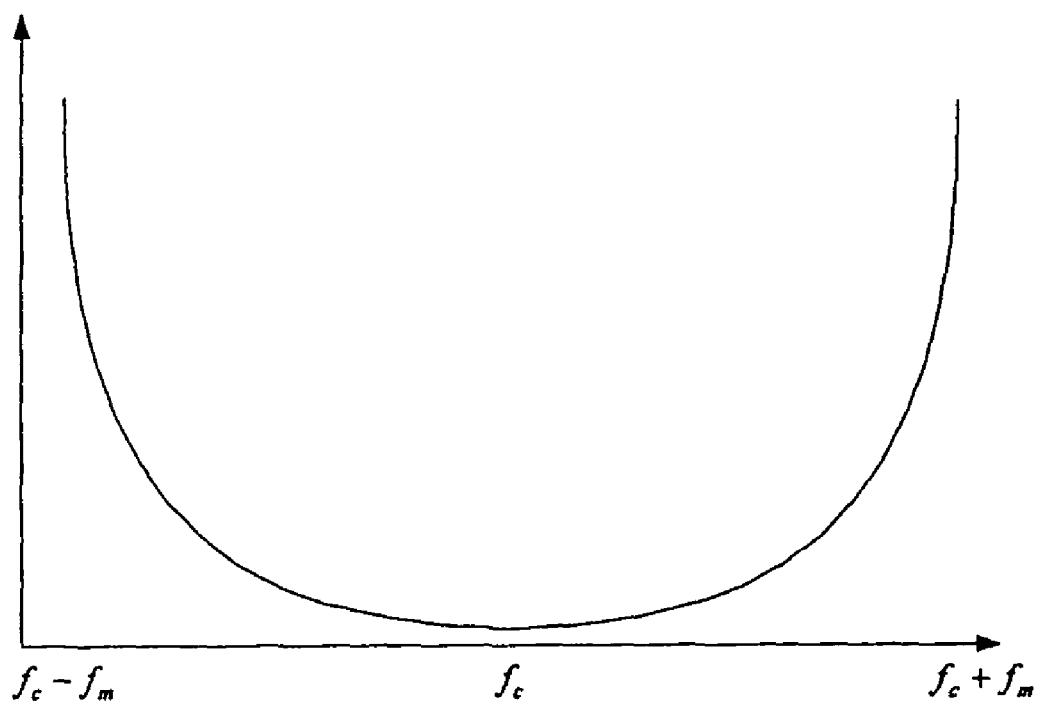
FIG. 2 illustrates the spectrum shape of a Doppler spread.
Figure 3:
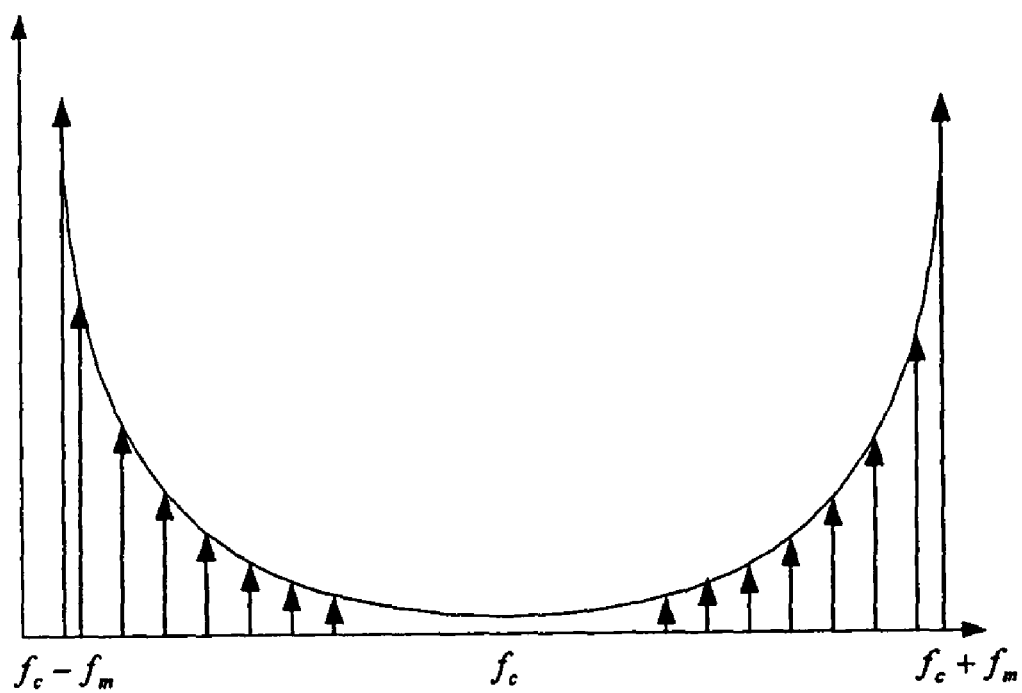
FIG. 3 illustrates segmentation of the Doppler spectrum spread.
Figure 4:
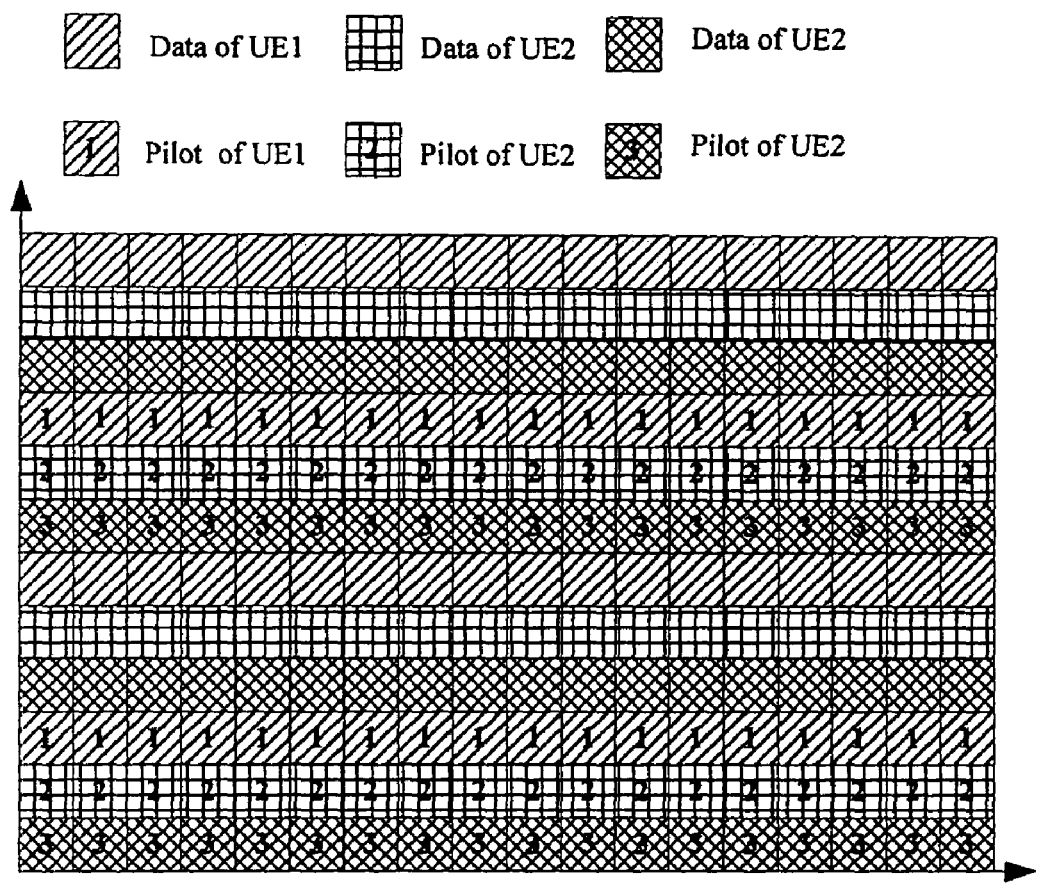
FIG. 4 illustrates an example of a pilot allocation scheme according to the present invention.

Assume three (3) UEs share the entire bandwidth, then FIG. 4 illustrates a distributed resource allocation diagram.

According to the channel model described above, the received signals in multi-user systems can be described as:

$$Y = \sum_{i=1}^{U} \sum_{l=0}^{L} \left( h_0^i(l)E_l^i X_i + \sum_{t=1}^{T} h_t^i(l)C_t^i E_l^i X_i \right) \qquad \text{Equation 15}$$

$$= \left( \sum_{i=1}^{U} \sum_{l=0}^{L} \left( h_0^i(l)E_l^i + \sum_{t=1}^{T} h_t^i(l)C_t^i E_l^i \right) \right) X$$

where $X_i$ is the transmitted signals of the $i^{th}$ UE in the frequency domain (the positions of other UEs' signals are set to zero), X is the integration of the transmitted signals of all UEs in the frequency domain. Y is the integration of the received signals of all UEs in the frequency domain. $h_i^i(l)$ is the channel responses of the $i^{th}$ UE. $C_t^i$ and $E_l^i$ are fixed matrixes for the $i^{th}$ UE comprising the column vectors extracted from $C_t$ and $E_l$ ($C_t$ and $E_l$ are described above) according to the following principals:

The $C_t^i$ and $E_l^i$'s column vectors corresponding to the signal position of the $i^{th}$ UE are the same as the corresponding column vectors of $C_t$ and $E_l$ The column vectors of $C_t^i$ and $E_l^i$ are set to zero when the column indexes aren't matched with the positions of the signal of the $i^{th}$ UE.

when $h_t^i(l)$ is estimated according to the iterative channel estimation scheme detailed above, the transmitted signals are recovered according to Equation 16.

$$X = f\left(\left(\sum_{i=1}^{U}\sum_{l=0}^{L}\left(h_0^i(l)E_l^i + \sum_{t=1}^{T} h_t^i(l)C_t^i E_l^i\right)\right)^{-1}\right)Y \quad \text{Equation 16}$$

$$= f\left(\left(\left(\sum_{i=1}^{U}\sum_{l=0}^{L} h_0^i(l)E_l^i\right) + \left(\sum_{i=1}^{U}\sum_{l=0}^{L}\sum_{t=1}^{T} h_t^i(l)C_t^i E_l^i\right)\right)^{-1}\right)Y$$

$$= f((A+B)^{-1})Y$$

where U is the number of UEs, $f((A+B)^{-1})$ is the function of $(A+B)^{-1}$ as determined by the employed equalization algorithm, e.g., ZF, MMSE, etc. However, it is necessary to determine the inverse matrix of $(A+B)$ no matter of what kind of algorithm is employed.

Obtaining the inverse of a matrix usually incurs huge computational costs especially for a big FFT size, so the present invention provides a technique for obtaining the inverse matrix with lower complexity. Considering $h_t^i(l)$ usually decreases along with the increase of t, a simplified algorithm is described below:

$$(A+B)^{-1} \approx (E + (A^{-1}B)^T) \ldots (E + ((A^{-1}B)^4)) \quad \text{Equation 17}$$

$$(E + ((A^{-1}B)^2)(E - (A^{-1}B)A^{-1}$$

$$= \left(\sum_{i=0}^{T}(-(A^{-1}B)^i)\right)A^{-1}$$

$A^{-1}$ is easy to calculate since A is a diagonal matrix, and the bigger T is, the more accurate Equation 17 will be.

Based on Equation 17, and taking MMSE as an example only to show how to equalize the received signals:

$$X = (E + ((A+B)^H(A+B))^{-1})^{-1}(A+B)^{-1}Y \quad \text{Equation 18}$$

$$= \left(E + \left(\sum_{i=0}^{T}(-(A^{-1}B)^i)A^{-1}A^{-H}\right.\right.$$

$$\left.\left.\left(\sum_{i=0}^{T}(-(A^{-1}B)^i)\right)^H\right)^{-1}(A+B)^{-1}Y\right.$$

$$= (C+D)^{-1}(A+B)^{-1}Y$$

where $$C = E + A^{-1}A^{-H}$$

$$D = A^{-1}A^{-H}\left(\sum_{i=1}^{T}(-A^{-1}B)^i\right)^H + \left(\sum_{i=1}^{T}(-A^{-1}B)^i\right)A^{-1}A^{-H} +$$

$$\left(\sum_{i=1}^{T}(-A^{-1}B)^i\right)A^{-1}A^{-H}\left(\sum_{i=1}^{T}(-A^{-1}B)^i\right)^H$$

Since C is a diagonal matrix and usually C is bigger than D, $(C+D)^{-1}$ can be determined using the above described approach for Equation 17.

With Equation 17 and Equation 18, the equalization is conducted via a matrix, multiplying operation instead of a matrix inverse operation, which can significantly reduce the computational complexity from $o(n^3)$ to $o(n^{1.5})$.

The provided scheme can be applied for multi-carrier systems (e.g., OFDM, SC-FDMA, MC-CDMA, etc), and is especially effective under high mobility environment.

Figure 5:
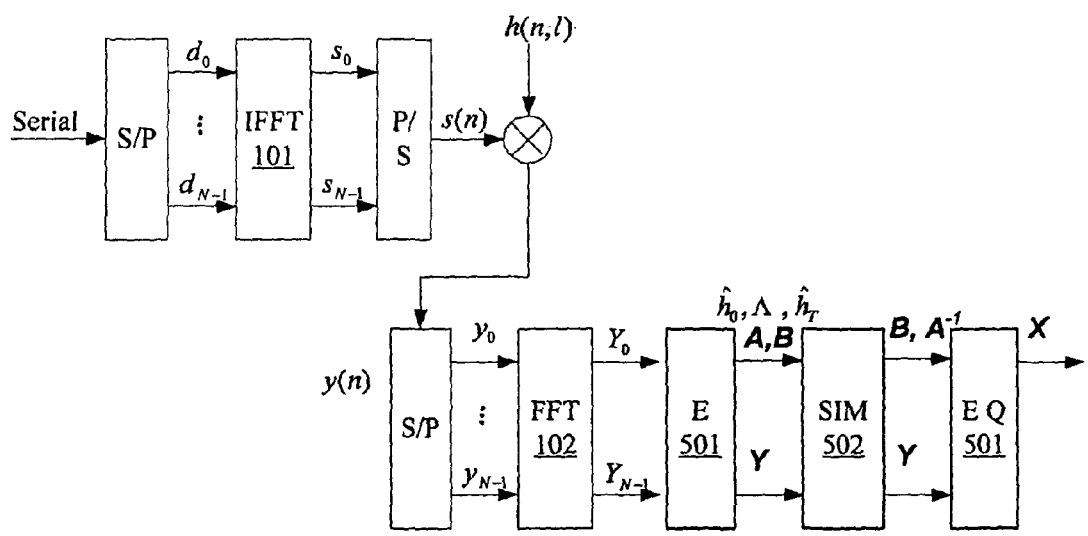
FIG. 5 illustrates and OFDM system modified according to the present invention to include an estimation module that iteratively estimates the channel features and performs ICI cancellation.

Referring now to FIG. 5, an exemplary embodiment of an OFDM system according to the present invention is illustrated in which the receiver comprises means to implement an equalization scheme for distributed resource allocation in multi-carrier systems that is diagrammatically shown by the blocks E 501, SIM 502 and EQ 503. In the present invention an OFDM system transmit blocks of N symbols where the shape and size of the block processed on reception is free, in order to best match block size to the system architecture.

The purpose of the invention is to detect multiple users for distributed resource allocation in multi-carrier systems through a process disclosed above and accomplished by modules E 501, SIM 502 and EQ 503. In an exemplary embodiment, this is accomplished by transmitting pilot signals with the signals of the data part set to zero and the OFDM receiver of FIG. 5 demodulating a received pilot signal with the Fast Fourier transform 102 and then Estimation module E 501 iteratively calculating and removing ICI by computing Equation 13 for the first round of an iteration and Equation 14 for the remaining rounds of the iteration, up to an including a rank T. Other iterative approaches can be used to determine the channel feature matrix A and a matrix B that characterizes ICI coming from the plurality of UEs. The determined channel feature matrix A is then inverted by a Simplified Inversion Module SIM 502 since A is a diagonal matrix and Equation 17 is calculated. Finally, EQualization is performed by equalization module EQ 503 using a known technique and the transmitted signals are estimated using Equation 16.

While exemplary embodiments of the present invention have been provided, one skilled in the art will realize that the invention is not limited to the specific details and exemplary embodiments shown and described herein. Accordingly, various modifications may be made thereto without departing from the spirit or scope of the general inventive concept as defined by the appended claims and their equivalents.

What is claimed is:

1. An equalization method for distributed resource allocation in multi-carrier systems having a plurality of user equipment (UEs), comprising:

providing a channel estimation module configured for obtaining a channel feature matrix including channel parameters and a matrix that characterizes inter-carrier interference (ICI) coming from the plurality of UEs;

using the channel estimation module for defining a channel model wherein received signals are described as a product of transmitted signals with the channel feature matrix that includes channel parameters and a matrix that characterizes the ICI coming from the plurality of UEs, wherein the channel estimation module is used in an iterative estimation process including iterative linear channel estimation;
obtaining the channel feature matrix including the channel parameters and ICI by using the channel estimation module as part of an estimation process that is based on the defined channel model;
using an inversion module for an inverting sum of the channel feature matrix plus the matrix that characterizes the ICI coming from the plurality of UEs, and therein providing an inverted channel response matrix; and
performing channel equalization.

2. The method of claim 1, wherein only pilot signals and no data signals are transmitted and the received pilot signals are used to estimate the channel feature matrix (A) and the matrix (B) for the ICI coming from the plurality of UEs employing the equation $Y_p = (A+B) X_p$, where $X_p$ is the transmitted pilot signals in the frequency domain and $Y_p$ is the received pilot signals in the frequency domain.

3. The method of claim 1, wherein the channel feature matrix comprises two matrices: a first part comprising a plurality of target signals and a second part comprising characterizations of an ICI.

4. The method of claim 1, wherein the step of performing channel equalization includes using an equalization algorithm that is selected from the group consisting of zero forcing (ZF) and minimum mean-square error (MMSE).

5. The method of claim 1, wherein the step of performing channel equalization includes using a minimum mean-square error (MMSE) equalization algorithm.

6. The method of claim 2, wherein the step of performing channel equalization includes using an equalization algorithm is selected from the group consisting of zero forcing (ZF) and minimum mean-square error (MMSE).

7. An equalization system for distributed resource allocation in multi-carrier systems having a plurality of user equipment (UEs), comprising:
channel estimation means for obtaining a channel feature matrix A, comprising channel parameters, and a matrix B characterizing an inter-carrier interference (ICI) coming from the plurality of UEs such that received signals are Y=(A+B) X;
means for inverting the matrix A+B to obtain $(A+B)^{-1}$ using $A^{-1}$ and the equation $$(A+B)^{-1} \approx (E+(A^{-1}B)^T)\ldots(E+((A^{-1}B)^4)(E+((A^{-1}B)^2)$$
$$(E-(A^{-1}B)A^{-1}$$
$$= \left(\sum_{i=0}^{T}(-(A^{-1}B)^i)\right)A^{-1};$$

and
a channel equalization module to perform equalization according to an equalization algorithm using the inverted channel feature matrix $A^{-1}$ to provide an estimate of transmitted signals $X=f((A+B)^{-1})Y$.

8. The system of claim 7, wherein the equalization algorithm is selected from the group consisting of zero forcing (ZF) and minimum mean-square error (MMSE).

9. The system of claim 7, wherein the channel estimation means is an iterative linear channel estimation process wherein only pilot signals and no data signals are transmitted and received pilot signals are used to estimate the channel feature matrix A and the matrix B for the ICI coming from the plurality of UEs employing the equation $Y_p = (A+B) X_p$, where $X_p$ is the transmitted pilot signals in the frequency domain and $Y_p$ is the received pilot signals in the frequency domain.

10. The system of claim 9, wherein the equalization algorithm is selected from the group consisting of zero forcing (ZF) and minimum mean-square error (MMSE).

11. The system of claim 10, wherein based on a defined channel model, the transmitted signals are recovered using the matrix A and the matrix B and the following equation in which the received signals in multi-user systems are described as:

$$Y = \sum_{i=1}^{U}\sum_{l=0}^{L}\left(h_0^i(l)E_l^i X_i + \sum_{t=1}^{T} h_t^i(l)C_t^i E_l^i X_i\right)$$
$$= \left(\sum_{i=1}^{U}\sum_{l=0}^{L}\left(h_0^i(l)E_l^i + \sum_{t=1}^{T} h_t^i(l)C_t^i E_l^i\right)\right)X$$
$$= (A+B)X$$

where U is the number of UEs, $X_i$ is the transmitted signals of the $i^{th}$ UE in the frequency domain where the positions of other UEs' signals are set to zero, X is the integration of the transmitted signals of all UEs in the frequency domain, where Y is the integration of the received signals of all UEs in the frequency domain, where $h_t^i(l)$ is the channel responses of the $i^{th}$ UE, and $C_t^i$ and $E_l^i$ are fixed matrixes for the $i^{th}$ UE comprising column vectors extracted from an ICI matrix $C_t$, and where a phase rotation matrix $E_l$ according to pre-determined selection criteria.

12. The system of claim 11, wherein the pre-determined selection criteria comprise:
the $C_t^i$ and $E_l^i$ column vectors corresponding to the signal position of the $i^{th}$ UE are the same as the corresponding column vectors of $C_t$ and $E_l$
the column vectors of $C_t^i$ and $E_l^i$ are set to zero when the column indexes are not matched with the positions of the signal of the $i^{th}$ UE.

13. An equalization system for distributed resource allocation in multi-carrier systems having a plurality of user equipment (UEs), comprising:
a channel estimation module for obtaining a channel feature matrix A, comprising channel parameters, and a matrix B characterizing the ICI coming from the plurality of UEs such that received signals are Y=(A+B) X;
a simplified module for inverting the matrix A+B to obtain $(A+B)^{-1}$ using $A^{-1}$ and the equation $$(A+B)^{-1} \approx (E+(A^{-1}B)^T)\ldots(E+((A^{-1}B)^4)(E+((A^{-1}B)^2)$$
$$(E-(A^{-1}B)A^{-1}$$
$$= \left(\sum_{i=0}^{T}(-(A^{-1}B)^i)\right)A^{-1};$$

and
a channel equalization module to perform equalization according to an equalization algorithm using the inverted channel feature matrix $A^{-1}$ to estimate the transmitted signals $X=f((A+B)^{-1})Y$.

14. The system of claim 13, wherein the equalization algorithm is selected from the group consisting of zero forcing (ZF) and minimum mean-square error (MMSE).

15. The system of claim 13, wherein the channel estimation module is an iterative linear channel estimation process wherein only pilot signals and no data signals are transmitted and the received pilot signals are used to estimate the channel feature matrix A and the matrix B for the ICI coming from the multiple UEs employing the equation $Y_p = (A+B) X_p$ where $X_p$ is the transmitted pilot signals in the frequency domain and $Y_p$ is the received pilot signals in the frequency domain.

16. The system of claim 15, wherein the equalization algorithm is selected from the group consisting of zero forcing (ZF) and minimum mean-square error (MMSE).

* * * * *